United States Patent [19]

McGuire et al.

[11] Patent Number: 5,035,581
[45] Date of Patent: Jul. 30, 1991

[54] FLUID LEVEL MONITORING AND CONTROL SYSTEM

[76] Inventors: Danny G. McGuire, 1205 W. Beech, Duncan, Okla. 73533; Damon C. McGuire, 201 Horizon Dr., Apt. No. 1, Altus, Okla. 73521; Denver C. McGuire, P.O. Box 1126, Roland, Okla. 74954; Mark E. Sudberry, 2020 Gatlin, Duncan, Okla. 73533

[21] Appl. No.: 438,583

[22] Filed: Nov. 17, 1989

[51] Int. Cl.⁵ .................. F04B 49/02; F04B 49/04
[52] U.S. Cl. ................................ 417/36; 417/41; 417/44; 417/63; 200/84 R
[58] Field of Search .............. 417/36, 40, 41, 44, 417/63; 340/612, 618; 73/313, 304 R; 200/84 R

[56] References Cited

U.S. PATENT DOCUMENTS

| | | | |
|---|---|---|---|
| 1,297,938 | 3/1919 | Varner | 200/84 R |
| 2,697,196 | 12/1954 | Harper | 318/482 |
| 2,947,931 | 8/1960 | Hubby | 318/447 |
| 3,075,466 | 1/1963 | Agnew et al. | 103/25 |
| 3,105,443 | 10/1963 | Johnson | 103/12 |
| 3,377,537 | 4/1968 | Brailsford | 318/444 |
| 3,741,683 | 6/1973 | McTamaney et al. | 417/7 |
| 3,800,205 | 3/1974 | Zalar | 318/482 |
| 3,969,941 | 7/1976 | Rapp | 73/290 R |
| 4,171,186 | 10/1979 | Chapman | 417/40 |
| 4,387,434 | 6/1983 | Moncrief, Jr. et al. | 137/392 |
| 4,551,068 | 11/1985 | Boudreaux | 417/36 |
| 4,678,403 | 7/1987 | Rudy et al. | 417/12 |

Primary Examiner—Leonard E. Smith
Assistant Examiner—David W. Scheuermann
Attorney, Agent, or Firm—Mary M. Lee

[57] ABSTRACT

A system for monitoring and controlling the level of a fluid in a vessel, particularly applicable to controlling the pump operation at an oil well. The system includes a fluid level sensing unit having a plurality of sensors positioned at selected levels in the well casing outside the tubing string. The sensors operate independently to detect the presence of fluid and emit electrical signals which are received by a data conversion and sending unit immediately above the fluid level sensing unit in the well casing. The data conversion and sending unit converts the signals into discreet digital data bits which can be transmitted sequentially in one conductive wire to a data management and pump control unit at a convenient location nearby, usually at the well site. Thus, there is no need for a wire extending from each sensor. The data bits received by the data management and pump control unit are converted to a visual display in a light emitting diode panel. A pump flip-flop automatically operates the pump operating assembly in response to the rise and fall of oil or fluid in the well. The data from the sensors also is fed to a computer which stores the data for later retrieval. The computer also calculates other useful information and generates graphics which assist in the management of the oil recovery process.

23 Claims, 12 Drawing Sheets

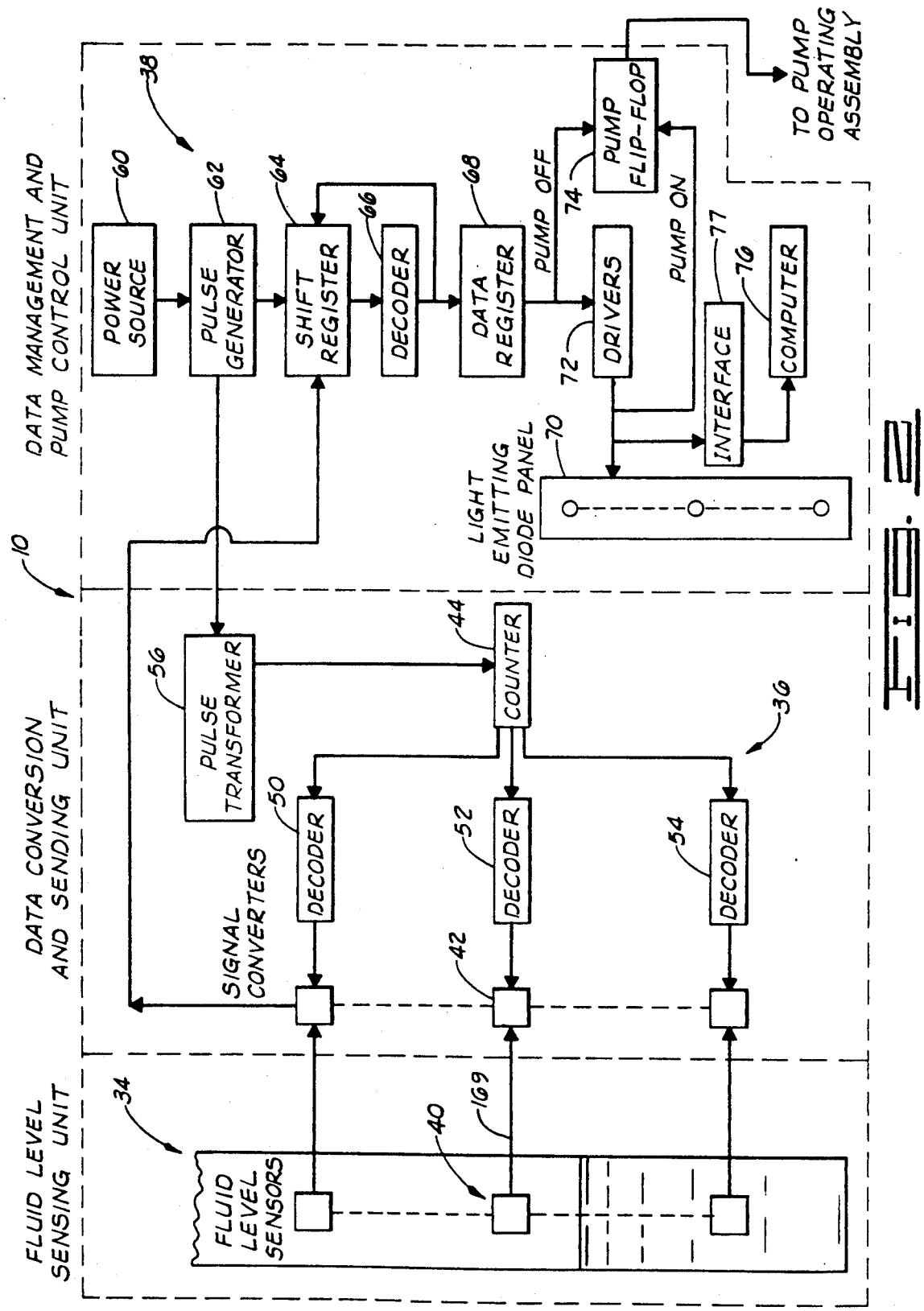

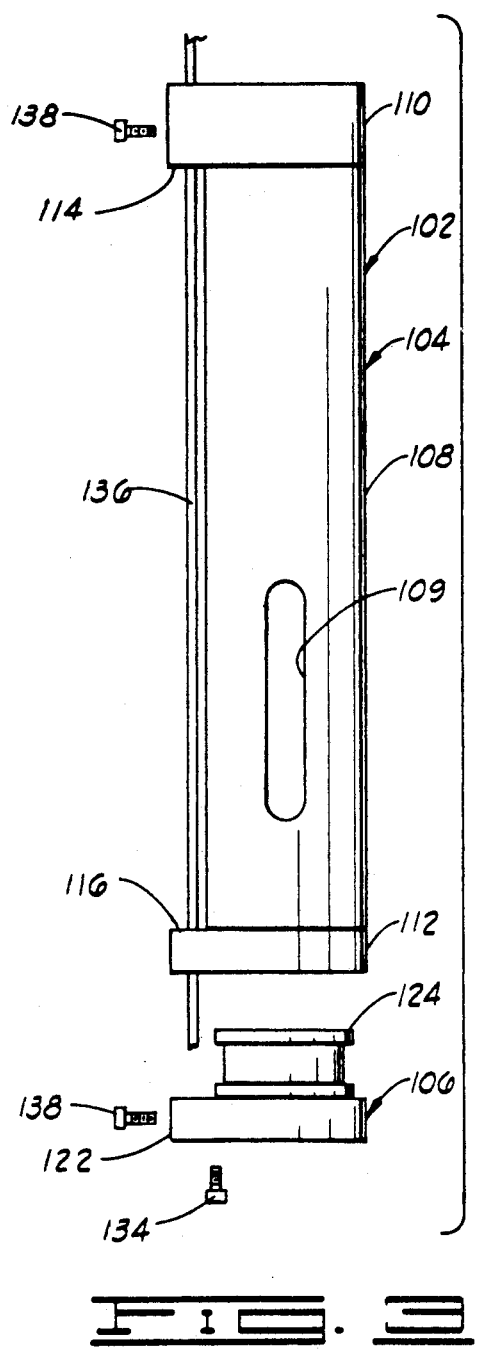
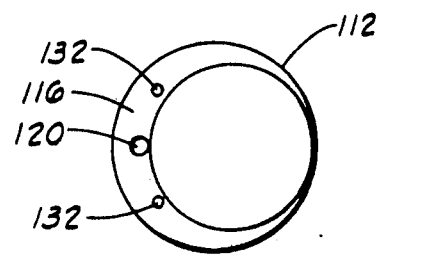
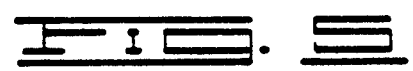
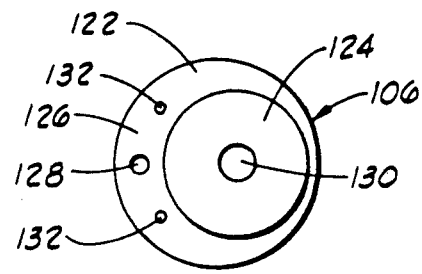
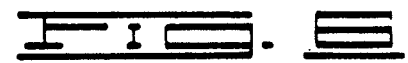
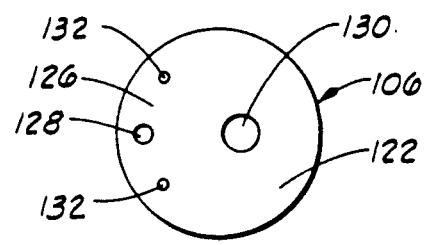
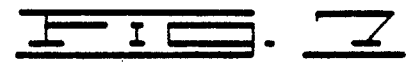
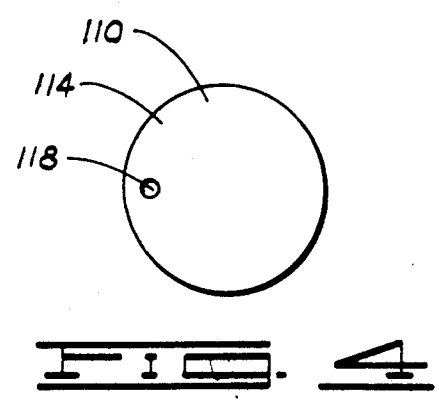
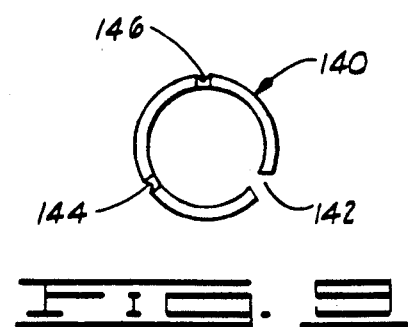
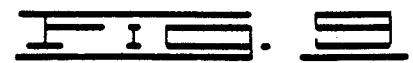

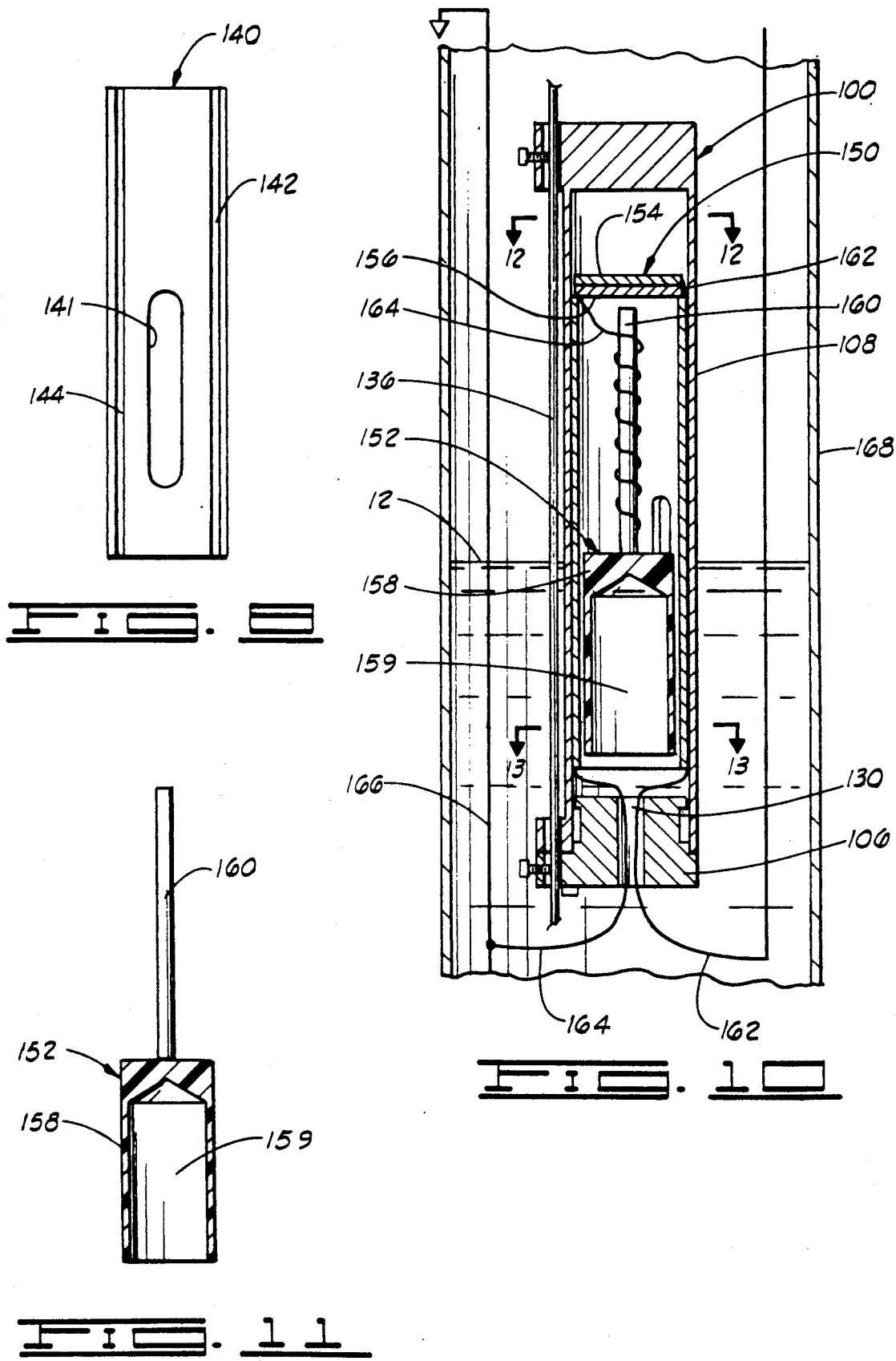

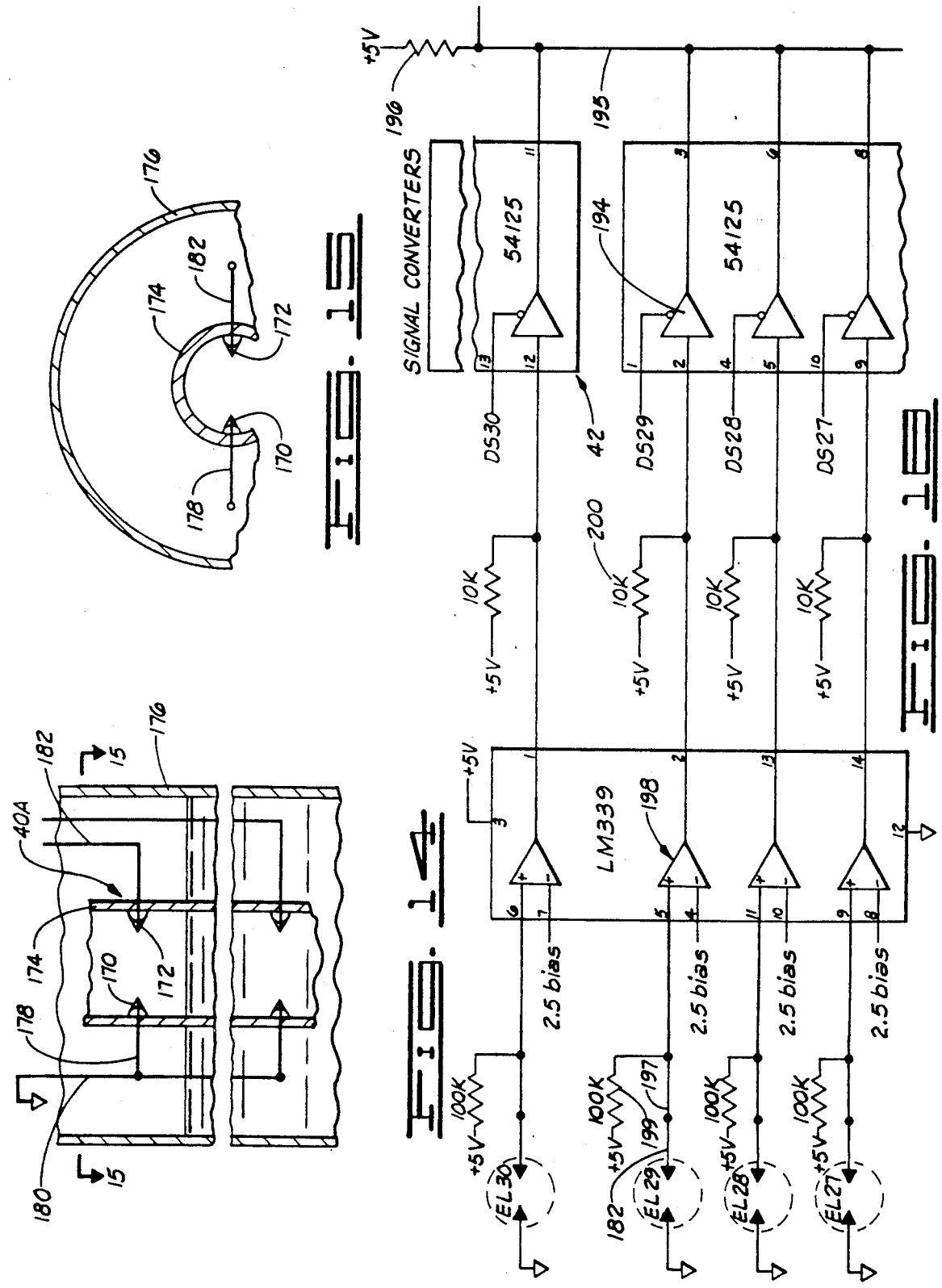

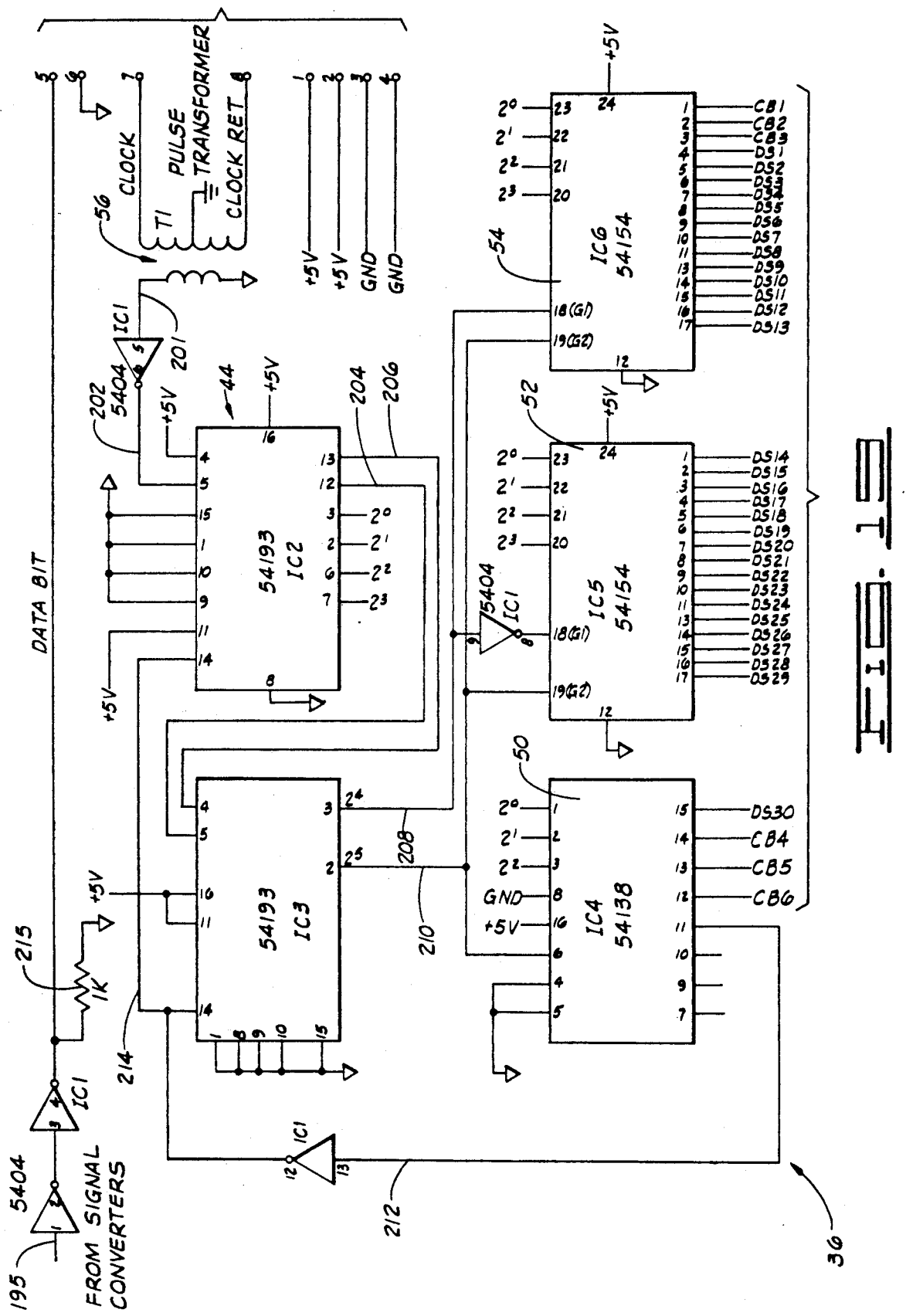

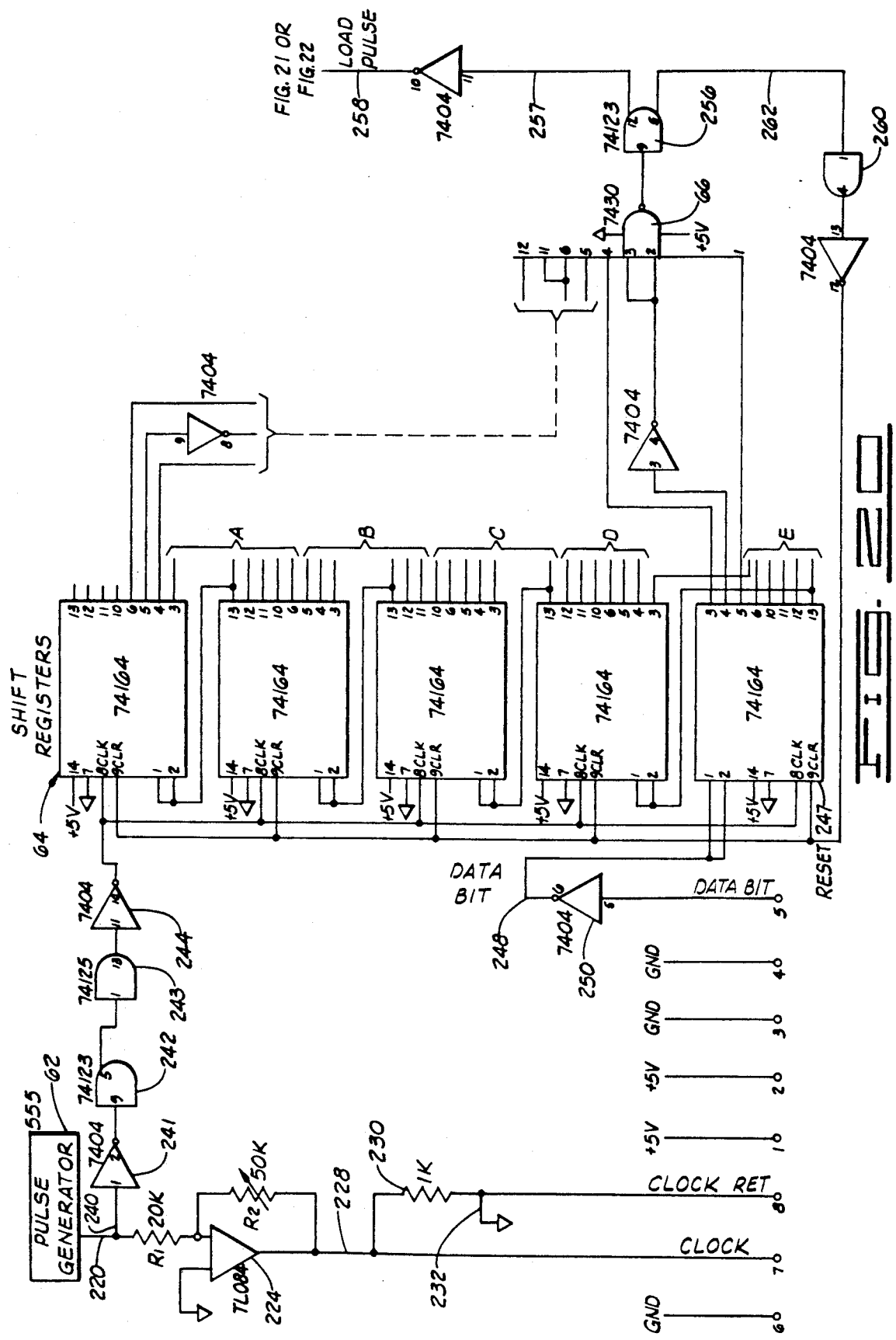

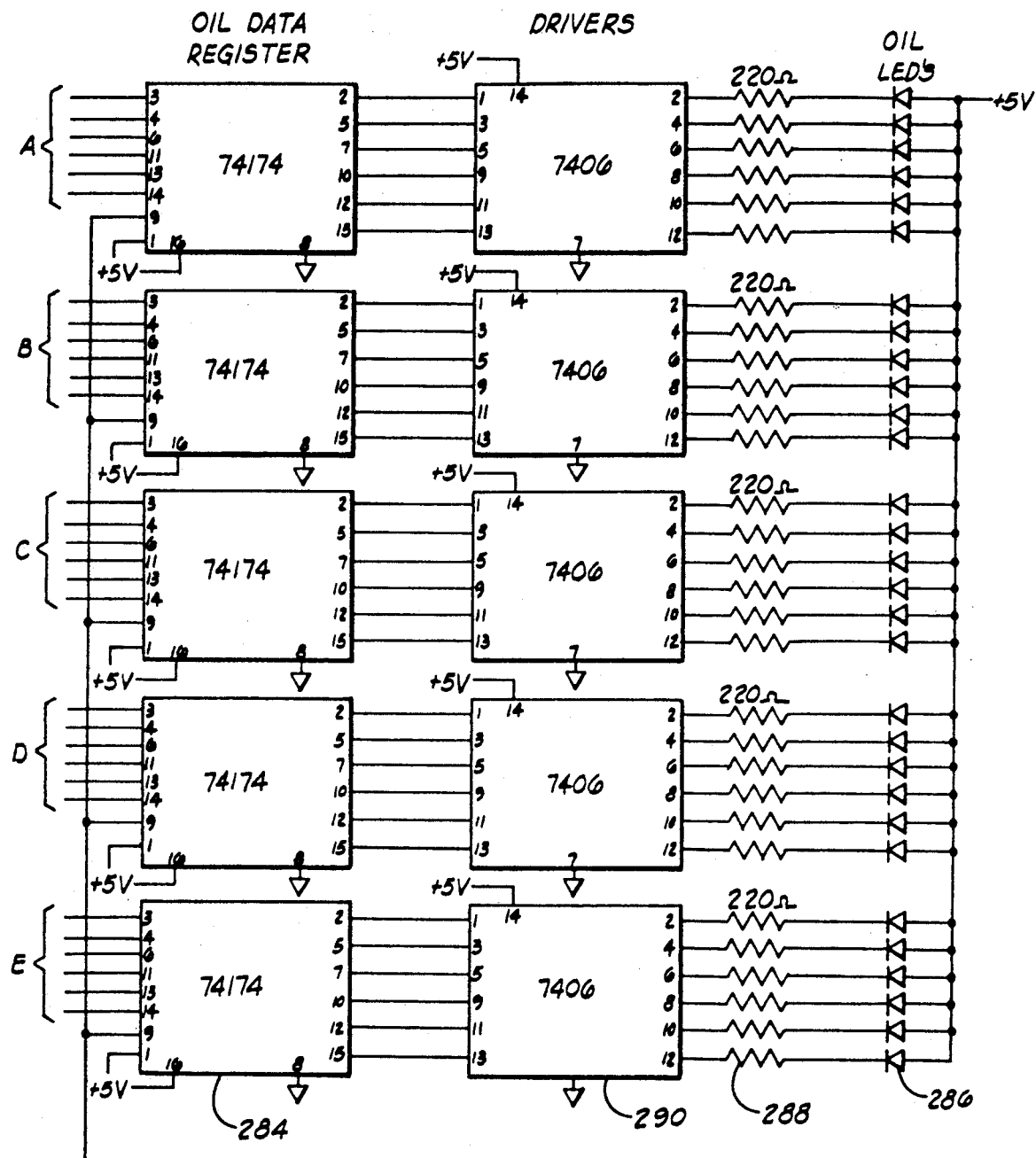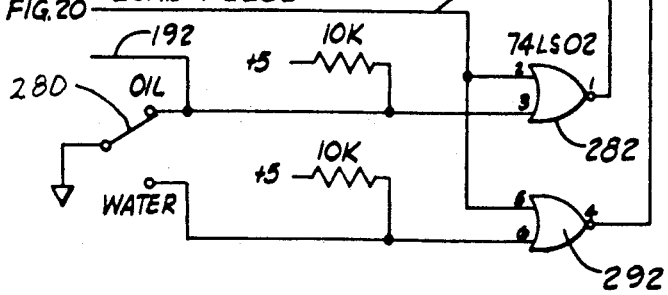

FLUID LEVEL MONITORING AND CONTROL SYSTEM

FIELD OF THE INVENTION

The present invention relates generally to devices for monitoring and controlling fluid levels in vessels and particularly to systems for monitoring and controlling the level of fluid in oil wells.

SUMMARY OF THE INVENTION

The present invention comprises a switch for sensing changes in the level of a fluid in a vessel. The switch comprises a housing with a hollow perforate body and a first conductive contact element in the housing. A second buoyant conductive contact element is supported in the housing below the first contact element for movement relative to the level of fluid in the housing. The second element moves between a first position, in which there is no contact with the first contact element, and a second position in which there is contact with the first contact element. Means is included for interposing the first and second contact elements in an electric circuit.

The present invention further comprises a system for monitoring the level of fluid in a vessel. The system comprises a plurality of sensors supported at selected levels in the vessel. Each sensor is capable of inputting an electrical signal and, in response thereto, emitting a first signal and a second signal. A first signal indicates that the sensor is submerged in fluid. A second signal indicates that the sensor is not submerged. The output of each sensor is independent of each other sensor. The system further comprises means for transmitting an electrical signal to each of the sensors and means for converting the first and second signals produced by the sensors into digital signals. Still further, the system comprises means for receiving the digital signals from the signal converter means and converting the digital signals to a humanly perceivable form.

Still further, the present invention comprises a system for monitoring and controlling the level of fluid in a vessel. The above described fluid monitoring system is combined with means responsive to the digital signals from the signal converter means for adjusting the fluid level in the vessel, as indicated by the sensors, to a preselected level.

BRIEF DESCRIPTION OF THE FIGURES

FIG. 2 is a schematic diagram of the components of the fluid level monitoring and control system.

FIG. 3 is an exploded side elevational view of the housing of a switch used in one of the embodiments of the fluid level sensing unit of the present invention.

FIG. 4 is a plan view of the body of the switch housing shown in FIG. 3.

FIG. 5 is a bottom view of the body of the switch housing shown in FIG. 3.

FIG. 6 is a plan view of the bottom of the switch housing.

FIG. 7 is a bottom view of the bottom of the switch housing.

FIG. 8 is a side elevational view of the sleeve of the switch.

FIG. 9 is a plan view of the sleeve shown in FIG. 8.

FIG. 10 is a sectional side elevational view of the assembled switch suspended in a support pipe.

FIG. 11 is a sectional side elevational view of the buoyant contact element of the switch.

FIG. 14 is a partly sectional, side elevational view of an alternate embodiment of the sensors in the fluid level sensing unit. In this embodiment each sensor is a pair of metal electrodes.

FIG. 15 is a sectional view taken along line 15—15 of FIG. 14.

FIG. 18 is a schematic representation of the circuitry and the integrated circuits which convert the electrical signals from the electrode type sensors in the fluid level sensing unit to digital data bits.

FIG. 19 is a schematic representation of the circuitry of the data collection and sending unit, excluding the alternative signal converters, which are shown in FIGS. 17 and 18.

FIG. 20 is a schematic representation of a portion of the data management and pump control unit. In this portion the data bits from the sensors in the fluid level sensing unit are input to shift registers.

FIGS. 22 and 23 are schematic representations of another portion of the data management and pump control unit. This embodiment operates in conjunction with the sensor embodiment shown in FIG. 16. The data bits are fed alternately to one of two sets of light emitting diodes, one of which indicates the water level in the well and one which indicates the oil level in the well.

DETAILED DESCRIPTION OF THE PREFERRED EMBODIMENTS

In the management of the recovery of fluid from oil wells, there often is the problem of controlling the pump operation to accommodate a production rate which is substantially less than the pump is capable of removing. If the pump is operated continuously, the well will be pumped dry. The continued operation of the pump in a dry well is inefficient and is likely to damage the pumping apparatus.

The present invention provides a system for continuously monitoring the level of fluid in an oil well. Data indicating the changing fluid level is converted to a humanly perceivable form, preferably a visual display. The data is updated several times a minute and may be stored in a computer. Using this data, the computer can be programmed to calculate useful information and generate graphics which aid in the management of the oil recovery process.

The design of the system minimizes the amount of wiring and mechanical parts and provides a system which is economical to manufacture and simple to install. Moreover, the system once installed requires virtually no maintenance. Other advantages and feature of the system of this invention will be apparent from the following description.

Overview of the System

Figure 1:
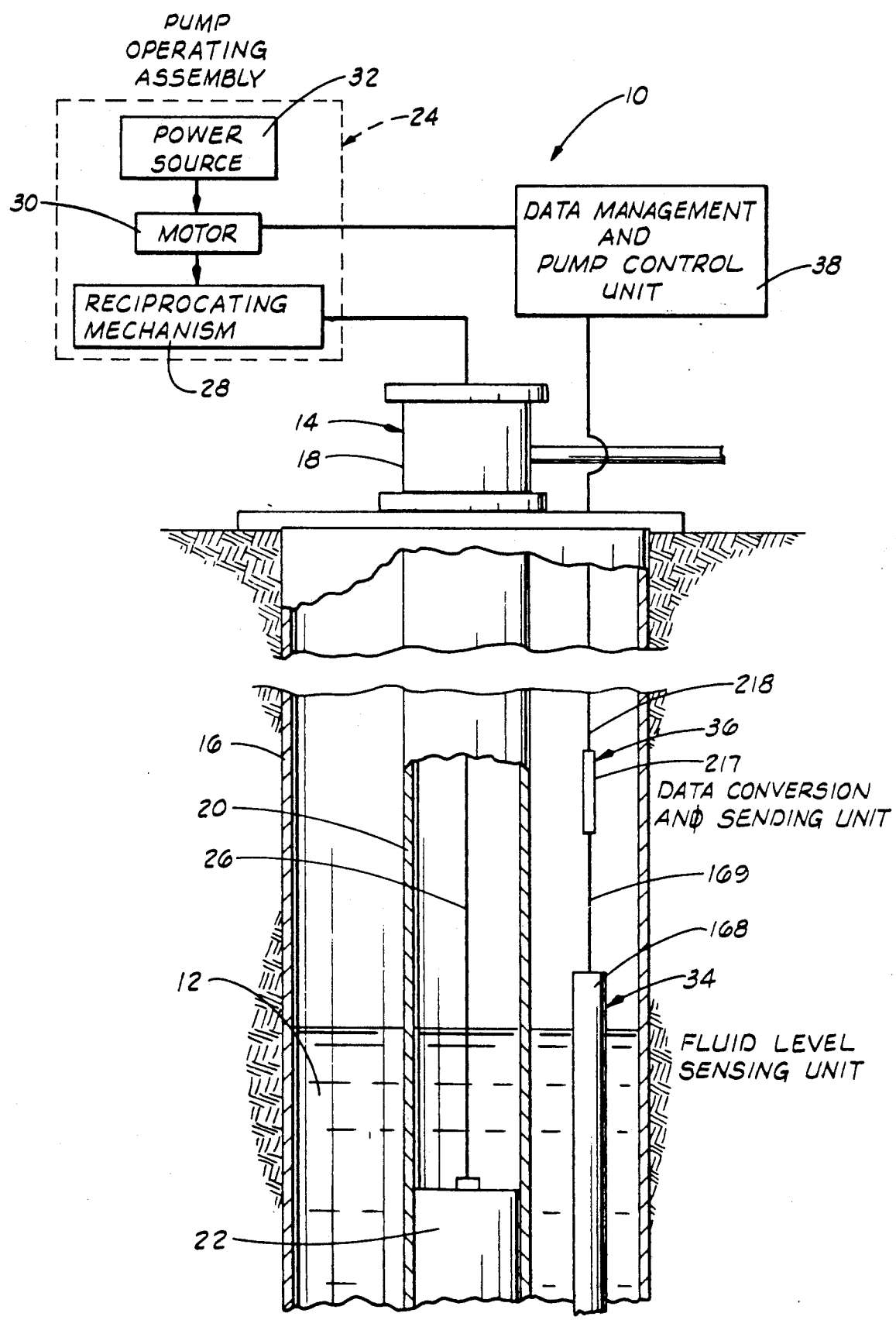
FIG. 1 is a view partly in section and partly diagrammatic of a fluid level monitoring and control system in accordance with the present invention.

With reference to the figures in general and to FIG. 1 in particular, the present invention is directed to a system, designated by the reference numeral 10, for monitoring and preferably also for controlling the level of fluid in a vessel. As described herein, the system 10 is useful particularly to monitor and control the level of fluid 12, usually oil or water, or a combination of these, in an oil well 14. However, it will be appreciated that the present invention has many other applications.

As shown in FIG. 1, a typical oil well generally comprises a subsurface well casing 16 connected to a well head 18 above ground. A tubing string 20 contains a pump 22 usually reciprocated by a pump operating assembly 24 at the well head 18 by means of a sucker rod 26. The pump operating assembly 24, shown here only schematically, typically comprises a reciprocating mechanism 28 driven by a motor 30 powered by a suitable power source 32.

The system 10 of the present invention preferably includes a fluid level sensing unit 34 positioned in a vessel such as the well casing 16 outside the tubing string 20 at the level of the fluid 12 being recovered from the well 14. A data conversion and sending unit 36 is connected to the sensing unit 34 and is supported in the well casing 16 above the sensing unit. The data conversion and sending unit 36 is connected to a data management and pump control unit 38 at a readily accessible location above ground, usually at the well site. The data management and pump control unit 38 is connected to the motor 30 of the pump operating assembly 24. In this way, the system 10 of the present invention can control the pumping operation in response to the level of fluid 12 in the well 14 and thereby control the fluid level in the well.

The components of the fluid level monitoring and control system 10 are depicted schematically in FIG. 2. The fluid level sensing unit 34 preferably comprises at least two, and more preferably thirty, sensors designated collectively by the reference numeral 40. 10 The sensors 40 are supported at selected levels in the well casing 16 (FIG. 1). The positions of the sensors 40 are selected so that at least one sensor is at a high point, or where the pump should be turned on, and one sensor is at a low point, or where the pump should be turned off. In the preferred embodiment comprising 30 sensors, the remaining sensors 40 are positioned at regular intervals between the high and the low point.

The sensors 40 are capable of inputting an electrical signal and, in response thereto, emitting a first signal if the sensor is submerged in fluid and a second signal if the sensor is not submerged in fluid. The input signal preferably is a continuous voltage which includes 0 voltage produced by connecting the sensors in series with a common ground. The output signals then may consist of 0 voltage if the sensor is submerged and a positive voltage, such as +5 volts, if the sensor is not submerged. Therefore, as used herein, the term electrical signal includes within its scope 0 voltage, as in the case of an open switch.

The first and second signals output by each of the sensors 40 are transmitted to the corresponding signal converter in the data conversion and sending unit 36. The signal converters are designated collectively herein by the reference numeral 42. The signals received by the signal converters 42 are isolated sequentially. This may be accomplished by the use of a counter 44 and decoders 50, 52 and 54.

For example, a pulse transmitted to a pulse transformer 56 from the data management and pump control unit 38, yet to be described, is advanced through the counter 44 which counts the pulses. The count from the counter 44 next is transmitted to and then decoded by the decoders 50, 52 and 54. In response to the count, the decoders 50, 52 and 54 transmit a signal to the corresponding signal converter 42. A repeating series of signals then is transmitted from the signal converters 42 to the data management and pump control unit 38.

Referring still to FIG. 2, the data management and pump control unit 38 generally includes a power source 60 which drives a pulse generator 62. The pulse from the pulse generator 62 is advanced both to the pulse transformer 56 of the data conversion and sending unit 36, previously mentioned, and to a shift register 64 in the data management and pump control unit 38.

The pulse to the shift register 64 advances the series of signals received from the signal converters 42 in the data conversion and sending unit 36 through the shift register. The signals then are transmitted through a decoder 66 which triggers one-shot loading of the signals from the shift register 64 into a data register 68. The signals in the data register 68 control a light emitting diode ("LED") panel 70 by means of drivers 72. In this way the status (submerged or not submerged) of each sensor 40, and thus the level of fluid in the well 14 or other vessel, can be perceived readily by any person observing the LED panel.

In the preferred system, a mechanism such as a flip-flop circuit 74 is included for controlling the pump operating assembly 24 in response to the changing fluid level. Still further, it is preferred to incorporate a computer 76 in the data management and pump control unit by means of an interface assembly 77.

Having obtained an overview of the fluid level monitoring and control system of the present invention, attention now is directed to the detailed construction of the various components thereof.

Fluid Level Sensing Unit

Turning first to the fluid sensing unit 34, a first embodiment for the sensors 40 therein is shown in FIGS. 3-13. The sensor of this embodiment is a switch 100 (FIG. 10). As shown in FIG. 3, the switch 100 comprises a housing 102 having a hollow body 104 and a removable bottom 106, preferably formed of stainless steel. Aluminum or hardened plastic may be suitable substitutes.

The body 104 has an elongate tubular portion 108 with openings 109 therein. The tubular portion 108 has a first end 110 and a second end 112. The first and second ends 110 and 112 are positioned parallel to each other and have a diameter greater than the diameter of the tubular portion 108. The tubular portion 108 is asymmetrically disposed relative to the ends 110 and 112, so that a flanqe 114 and 116 is provided on each.

As best seen in FIG. 4 depicting the top of the housing 102, a hole 118 is formed in the flange 114 of the first end 110. As shown in FIG. 5 depicting the bottom view of the second end 112 of the housing with the bottom 106 removed, a corresponding hole 120 is formed in the flange 116 of the second end 112.

The bottom 106 is integrally formed of a cylindrical base 122 and a smaller but also cylindrical and asymmetrically positioned plug 124. Accordingly as best seen in FIGS. 6 and 7 depicting the top and bottom of the bottom 106, a flange 126 also is provided on the base 120 of the bottom 106. The flange 126 is provided with a hole 128 aligned with the holes 118 and 120 in the body 104. The plug 124 is sized to be matingly received in the body 104, and has a bore 130 therethrough.

The flange 126 of the bottom 106 and the flange 116 of the second end 112 of the body 104 both are provided with another pair of threaded bores 132 which receive screws 134 (FIG. 3) for removably attaching the bottom 106 to the body 104. Once attached, a line or rod 136 of some sturdy, flexible material is threaded through the holes 118, 120 and 128. The position of the switch 100 on the line 136 is secured by lock screws 138 received in threaded bores (not shown) which intersect the holes 118 and 128 in the housing 102 through which the line 136 passes. Thus, the switch 100 may be supported upright at any selected position along the line 136 which in most instances will support a number of other switches, as described elsewhere.

A sleeve 140, also preferably of stainless steel and shown in FIGS. 8 and 9, is provided in the switch 100. The sleeve 140 is sized to be snugly received inside the tubular portion 108 of the body 104, and has openings 141 which match the openings 109 in the tubular portion 108. Preferably, the sleeve is formed of a slightly resilient material, such as stainless steel, and has a longitudinal slit 142. This permits the sleeve 140 to be compressed slightly for insertion into the body 104, after which the expansion of the sleeve renders it in tight frictional engagement with the body 104. A pair of longitudinal grooves 144 and 146 are formed in the wall of the sleeve for a purpose to be described.

With reference now to FIGS. 10 and 11, the switch 100 further comprises a first conductive contact element 150 and a second conductive contact element 152, the second element 152 being buoyant. The first element 150 (FIG. 10 only) preferably comprises a nonconductive support 154, which may be disk shaped (see also FIG. 12), and has an undersurface 156 covered by a conductive material, such as copper.

The second contact element 152, best shown in FIG. 10, comprises a buoyant body 158 which supports a mast 160 of conductive material, such as copper. The body 158 may be rendered buoyant by forming it of a buoyant material or by shaping it to have an air pocket 159, or both. As shown in FIG. 10, which shows the assembled switch 100 in longitudinal cross section, the first element 150 is supported inside and near the top of the tubular portion 108 of the body 104 on the upper edge of the sleeve 140.

Figure 12:
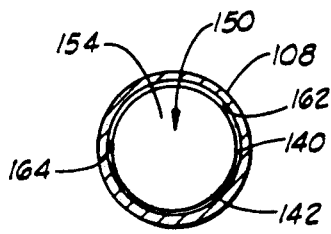
FIG. 12 is a sectional view taken along line 12—12 in FIG. 10.
Figure 13:
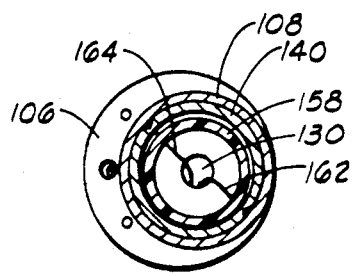
FIG. 13 is a sectional view taken along line 13—13 in FIG. 10.

A conductive wire 162 extends from the first element 150. A second conductive wire 164 coils about the mast 160 of the second element 152. The wires 162 and 164 extend down the housing body 104 between the inner wall of the tubular portion 108 and the grooves 144 and 146 of the sleeve 140, as shown in FIGS. 12 and 13. The wires 162 and 164 exit the housing through the bore 130 in the bottom 106 (see also FIG. 10). The wires 162 and 164 are used to interpose the switch in an electrical circuit and the rest of the system, to be described fully below. The conductive wires 162 and 164 preferably are 28 gauge, teflon-coated wiring.

Returning to FIG. 10, it now will be understood that, as the level of the fluid 12 rises and falls in the well casing 16, the buoyant second conductive contact element 152 rises and falls. More particularly, when the switch 100 is not submerged, the second contact element 152 rests at the bottom of the tubular portion 108 preventing contact between the conductive mast 160 and the conductive undersurface 156 of the first contact element. When the switch 100 is submerged, the second contact element 152 floats up until the conductive mast 160 abuts the undersurface 156 of the first contact element 150, thereby establishing electrical continuity between the wires 162 and 164 completing the circuit.

Referring still to FIG. 10, the wire 164 from the buoyant second contact element 152 is connected to a common ground wire 166. The wire 162 from the first contact element 150 exits the switch 100 and returns up the system and connects to the signal converters 42 in the data conversion and sending unit 36 (not shown in FIG. 10). Thus, the wire 162 outputs no voltage if there is no contact between the contact elements 150 and 152. If the switch is "closed", however, the ground connection is completed resulting in an output of 0 voltage.

As indicated previously, in the preferred practice of the present invention thirty switches are utilized. These switches all are positioned along the line 136 which preferably is contained within a protective covering. For example, the switches may be supported inside a length of perforated 2-inch plastic pipe 168. When the switches are spaced about one foot apart on the line 136, the pipe 168 will be about 30–32 feet long. As best seen in FIG. 1, the pipe 168 then is dropped down the well casing 16 to the desired level, usually adjacent the portion of the tubing string 20 containing the pump 22.

Alternately, a pair of pipes each containing 15 switches may be used. It will be understood that various other arrangements may be employed successfully.

The wires leaving the pipe 168 are joined immediately to a cable connecter (not shown) attached to a multi-wire cable 169, as shown schematically in FIG. 1. For example, where a single pipe containing 30 sensors is used, the cable connector will attach to a 31-wire cable (one ground wire and 30 return wires, one from each sensor) which connects to the data conversion and sending unit 36 for further processing, as is elsewhere described. Similarly, where two divided lengths of pipe are used, the lengths are connector by a 16-wire cable connecting (one ground wire and 15 return wires from the 15 sensor switches in the bottom pipe).

Turning now to FIGS. 14 and 15, there is shown therein an alternate embodiment for the sensors in the fluid level sensing unit 34. In this embodiment, each sensor 40A comprises a pair of electrodes 170 and 172. Each electrode preferably is a nub formed of a precious metal, such as platinum, gold or silver, so as to be highly resistant to corrosion and yet easily cleaned.

The electrodes 170 and 172 are supported a distance apart for sensing the resistance therebetween. This may be carried out by affixing the electrodes, by epoxy for example, to the inside of a small diameter pipe 174. A plastic pipe with an internal diameter of one-half inch is ideal as this will allow the electrodes to be mounted about one quarter inch apart. The pipe 174, of course, should be perforated in some suitable manner to allow the fluid to flow therethrough, although this feature is not shown in the drawings. The pipe 174 is supported inside a pipe 176, like the pipe 168, described above, which supports the switch type sensors.

In a manner similar to the switch type sensors, a wire 178 connects one of the electrodes 170 of each pair in series to a ground wire 180. Likewise, a return wire 182 from the other electrode 172 in each pair connects to the data conversion and sending unit 36. These wires are carried in the space between the inner pipe 174 and the outer pipe 176.

It will be appreciated that each pair of electrodes acts as a variable resistor. The resistance will be relatively high if the electrodes are not submerged and relatively low if the electrodes are submerged in a fluid, such as water, which conducts better than air. Thus, a signal from the return wire 182 indicating a relatively high resistance indicates that the electrodes are not submerged. Likewise, a signal indicating relatively low resistance shows that the electrodes are submerged.

The electrode type sensors offer certain advantages. The electrodes can be cleaned easily with concentrated nitric acid. Further, as the electrodes have no moving parts, they are less susceptible to damage or malfunction resulting from particulate matter which may be contained in some fluids.

Figure 16:
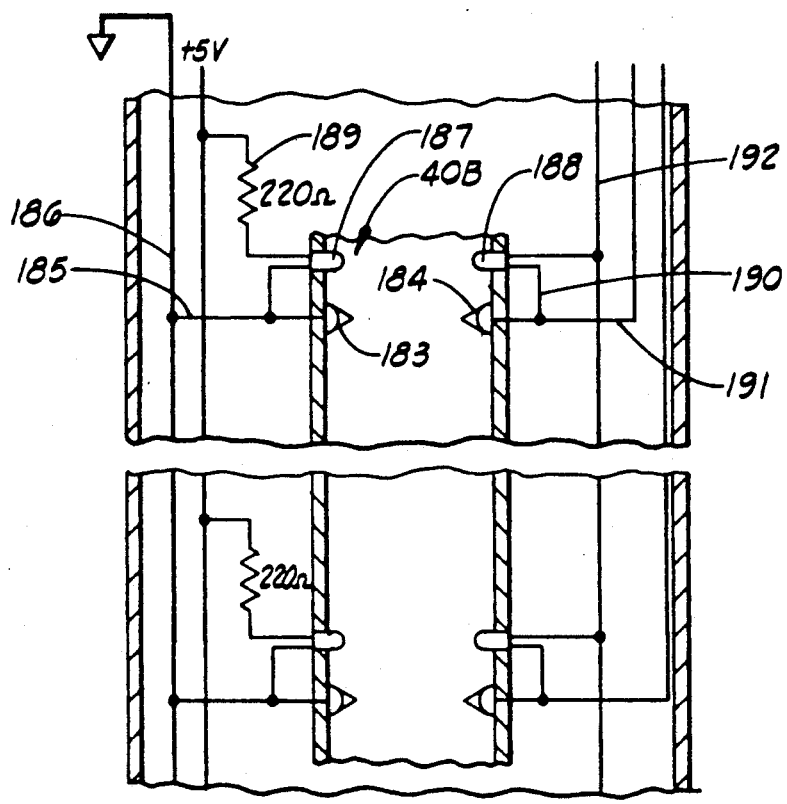
FIG. 16 is a partly sectional, side elevational view of another embodiment of the sensors in the fluid level sensing unit. In this embodiment each sensor comprises a pair of metal electrodes, a phototransistor and an infrared light emitting diode.

A third embodiment for the sensors is shown in FIG. 16. Sensors of this embodiment will render the system capable of distinguishing between water, a relatively conductive fluid, and oil which is relatively non-conductive.

Each sensor 40B comprises a pair of electrodes 183 and 184 like the electrodes 170 and 172 in the embodiment shown in FIGS. 14 and 15. The electrode 183 is connected by a wire 185 to a common ground wire 186.

Each sensor 40B further comprises an infrared light emitting diode 187 and a phototransistor 188. One terminal of the diode 187 is connected to the wire 185 from the electrode 183. The other terminal of the diode 187 is connected across a 220 Ohm fixed resistor 189 to +5 volts, and is connected in series with the diodes in the other sensors.

One terminal of the phototransistor 188 connects by the wire 190 to the electrode 184 and to a return wire 191 which connects to the signal converters 42. The other terminal of the phototransistor 188 connects by the wire 192 to an oil/water selection switch (not shown in FIG. 16).

Turning for a moment to FIG. 22, the oil/water switch operates between an "oil" position and a "water" position. In the "oil" position, the phototransistor 188 is connected to ground and thereby activated. In this mode, the presence or absence of oil can be sensed by the phototransistor 188 and the infrared light emitting diode 187. In the "water" position, the phototransistor 188 is disconnected from ground and disabled. Thus, the electrodes 183 and 184 will sense the presence or absence of water, functioning as in the previously described embodiment of FIG. 14. The oil/water switch will be described in more detail hereafter.

Data Conversion and Sending Unit

Referring back to FIG. 2, the data conversion and sending unit 36 comprises generally a pulse transformer 56, a counter 44, decoders 50, 52 and 54, and signal converters 42. The 31-wire cable 169 from the fluid level sensing unit connects to the data conversion and sending unit 36.

Figure 17:
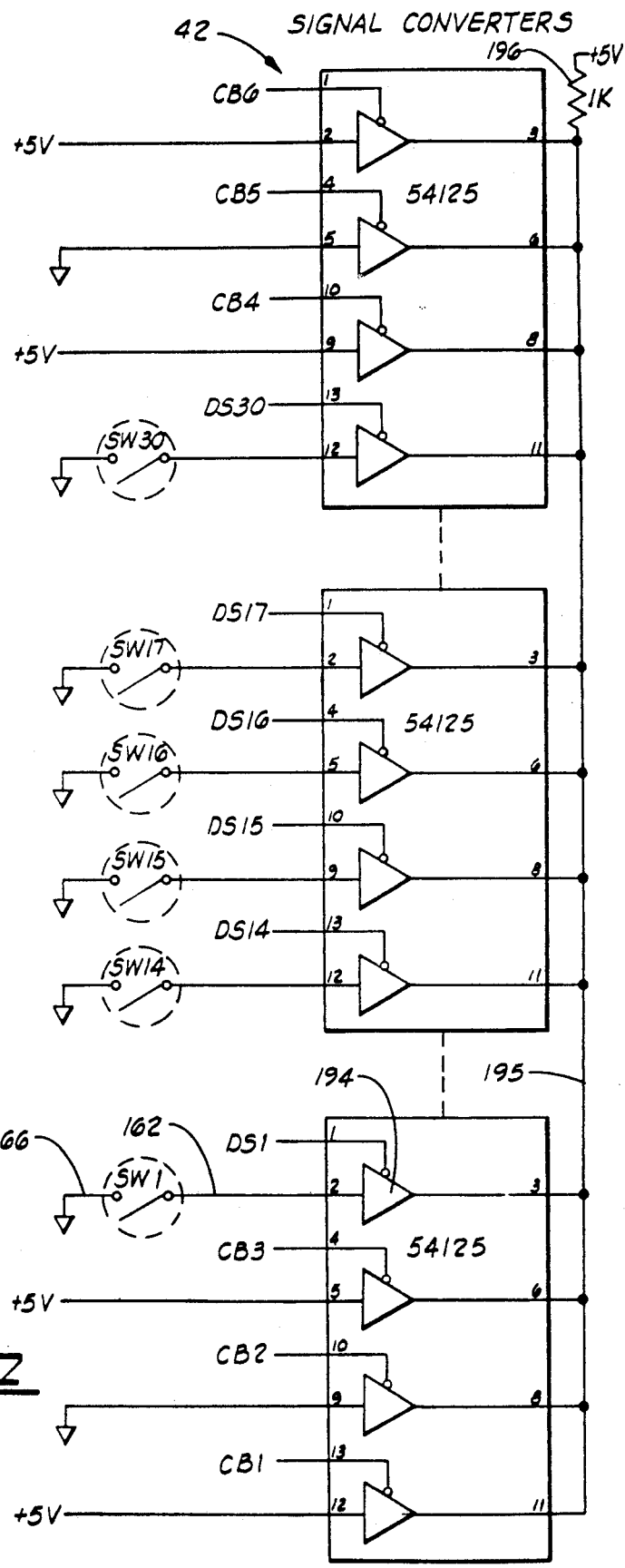
FIG. 17 is a schematic representation of the circuitry comprising the switches and the integrated circuits which convert the electrical signals from the switch type sensors of the fluid level sensing unit to digital data bits.

When switch type mechanisms are utilized as the sensors in the fluid level sensing unit, such as the switch 100 (FIGS. 3–13) described previously, the signal converters 42 preferably comprise a series of tri-state gates, one of which is designated 194, which are depicted in FIG. 17. Integrated circuits, such as 54125 circuits are ideal for this purpose. Each 54125 circuit comprises four tri-state gates. These gates output a "0" if the input is 0 volts and a "1" if the input is +5 volts.

As will be seen, a total of 36 tri-state gates are required where six control bits, described hereafter, and 30 sensors are included. Thus, a total of nine of the 54125 circuits is required.

With continuing reference to FIG. 17, the switches are designated by "SW" followed by the number of the switch. As previously described, each of the switches is connected to a common ground 166. Therefore, when the switch is open (not submerged), the return wire 162 (only one is numbered in the drawing) from the switch will transmit no voltage, and when the switch is closed (submerged), the return wire will transmit 0 voltage.

The return wire 162 from each switch is connected to the appropriate pin of the 54125 circuit to input the signal to the tri-state gate 194 in the signal converters 42. For example, as shown, the return wire 162 connects the first or lowest switch SW1 to pin 2 of the circuit.

The output lines from the four gates in each 54125 circuit connect at pin numbers 3, 6, 8 and 11, respectively, to a data bit transmission line 195. A +5 voltage is input into the data bit transmission line 195 via a "pull-up" resistor 196. So, when a switch is open (not submerged), the corresponding gate senses the +5 volts and outputs a "1" accordingly.

The sequence in which the data bits are output to the transmission line 195 is controlled by the sequence in which the tri-state gates 194 are activated. For example, if the gates 194 are triggered in the order of SW1 to SW30 and all the switches are closed (submerged), the sequence of data bits transmitted to the data management and pump control unit 38 will be a series of thirty 0's. On the other hand, if the first ten switches are submerged and the rest are not, the series will be ten 0's followed by twenty 1's.

It will be appreciated that the signal converters 42 allow each switch to be read independently. If one switch malfunctions, the malfunction will not affect the readings from the other switches.

To distinguish the beginning and the end of each sequence of bits, the first three and the last three gates in the sequence of circuits are adapted always to output a designated series, such as 1-0-1. This can be accomplished by inputting a +5 volts, ground and a +5 volts into the input pins for the first three gates and the last three gates, respectively. Thus, each full sequence of bits consists of 36 bits, three to tag the beginning, the 30 bits representing the status of the switches, and three to tag the end of the sequence. The six bits used to tag the beginning and the end of the sequence are referred to herein as control bits.

Referring still to FIG. 17, to control the sequence in which the 36 tri-state gates 194 are activated, signals in the selected order are sent from the decoders 50, 52 and 54 (FIG. 19) via wires. Wires carrying signals which activate the six control bits are designated "CB" followed by the number of the bit. Wires activating the gate to which a switch is connected, are designated by "DS" followed by the number of the switch.

The above circuity for the signal converters is modified, as shown in FIG. 18, when the electrode pairs of the sensors 40A in FIGS. 14 and 15, or the electrodes and accompanying infrared light emitting diodes and phototransistors of the sensors 40B in FIG. 16, are employed in lieu of mechanical switches. As has been described, each electrode pair ("EL" followed by the number of the electrode pair) acts as a variable resistor which registers a high resistance across the air when it is not submerged. When the electrodes become submerged, the resistance between the electrodes will decrease dramatically, the actual amount depending on the inherent resistance of the fluid.

The return wire from each electrode pair is connected in series with a fixed resistance. For example, the return wire 182 from EL29 is connected by an extension wire 197 to a comparator 198. Although not shown in FIG. 18, the return wire 191 of the embodiment of FIG. 16 would be connected similarly.

A +5 volts is fed into the extension wire 197 across a 100K fixed resistor 199. This is input into the positive terminal of the comparator 198.

An integrated circuit, such as an LM339 preferably is used as the comparators in this embodiment. The LM339 is a quad comparator, so a total of eight are required for the embodiment herein described.

The comparators 198 will output a +5 voltage when the electrodes are submerged and a near zero voltage when the electrodes are not submerged. The outputs of the comparators 198 are input into the signal converters 42, which operate as described previously. That is, an input of a +5 voltage is converted to a digital data bit of "1", and an input of 0 volts is converted to a "0".

A +2.5 bias voltage is input to the negative terminal of each comparator. The bias voltage can be varied to compensate for variations in resistance of the fluid being monitored. Between the comparators 198 and the signal converters 42, a +5 voltage is input across a 10K pull-up resistor 200.

As indicated, the data conversion and sending unit 36 has the capacity to isolate sequentially the tri-state gates 194 of the signal converters 42 to produce a series of bits corresponding to the sensors 40, 40A or 40B (SW 1-30 or EL 1-30) and the control bits CB1-6. This function is performed by the counter 44 and the decoders 50, 52 and 54, shown in more detail in FIG. 19 to which attention now is directed.

The data conversion and sending unit 36 is serviced by wires illustrated in the upper right hand portion of FIG. 19. Wires 7 and 8 are the clock ("CLOCK") and clock return ("CLOCK RET"). The CLOCK wire transmits pulses received from a master timer in the data management and pump control unit 38 to be described. The pulse period is selected according to the desired number of "readings" per minute.

The ends of the CLOCK and CLOCK RET wires terminate in the opposite ends of the pulse transformer 56 ("T1"). Thus, any stray pick-up or spurious pulses are cancelled.

In systems involving relatively short lines, the pulse transformer may be eliminated. In these instances, the CLOCK RET line also would be eliminated.

The line 201 connects the output of the pulse transformer 56 to an inverter, such as an integrated circuit 5404, designated herein as IC1. The inverted CLOCK pulse is transmitted by line 202 to the counter 44, which preferably comprises two 54193 integrated circuits, designated herein as IC2 and IC3.

Line 202 is connected to the "count up" pin o pin 5 of IC2. IC3 is connected in series to accommodate the number of sensors and control bits in the preferred embodiment. The line 204 connects the "carry" pin, pin 12, of IC2 to the "count up" pin, pin 5 of IC3. Line 206 connects the "borrow" pin, pin 13, of IC2 to the "count down" pin, pin 4, of IC3.

A +5 voltage is input to the "count down" pin, pin 4, of IC2, to the "load" pins, pin 11 on IC2 and IC3, and to other pins on the integrated circuits as shown. Similarly, many of the pins of these integrated circuits are connected to a common ground, as shown.

In IC2, pin 3 (QA) is $2^0$, pin 2 (QB) is $2^1$, pin 6 (QC) is $2^2$ and pin 7 (QD) is $2^3$. In IC3, pin 3 (QA) is $2^4$ and pin 2 (QA) is $2^5$. The output of IC2 and IC3 is transmitted to decoders 50, 52 and 54, designated in FIG. 19 as IC4, IC5 and IC6. The decoders preferably are integrated circuits #54138 (IC4) and #54154 (IC5 and IC6).

Pin 1 on IC4, pin 23 on IC5 and pin 23 on IC6 are $2^0$ and are connected (complete line not shown) accordingly to pin 3 of IC2. Pin 2 on IC4, pin 22 on IC5 and pin 22 on IC6 are $2^1$ and are connected (complete line not shown) accordingly to pin 2 on IC2. Pin 3 on IC4, pin 21 on IC5 and pin 21 on IC6 are $2^2$ and are connected (complete lines not shown) to pin 6 on IC2. Pin 20 on IC5 and pin 20 on IC6 are $2^3$ and are connected (complete line not shown) accordingly to pin 7 on IC2.

The output of pin 3 of IC3, which is $2^4$, is transmitted via line 208 to G1 of IC5, after being inverted by IC1, and to pin 18 of IC6. Line 210 connects pin 2, which is $2^5$, to pin 6 of IC4, to G2 of IC5 and to pin 19 of IC6.

Pulses are output sequentially by pins 1-11 and 13-17 of IC6, then pins 1-11 and 13-17 of IC5, and finally by pins 15, 14, 13 and 12 of IC4. These pins are connected, as indicated, to CB1, CB2, CB3, SW1-30 (or EL1-30), CB4, CB5, and CB6 (See FIGS. 17 and 18), in that order. Thus, the decoders IC4, IC5 and IC6 will, depending on the count, select one of the tri-state gates 194 in the signal converters 42 and activate it. As the count is advanced in the counters IC2 and IC3, the gates 194 will be activated one at a time in the following order: CB1, CB2, CB3, SW1-30 (or EL1-30), CB4, CB5, and CB6 (See FIGS. 17 and 18).

Line 212 connects pin 11 of IC4 to the "clear" pin, pin 14 on IC3. An inverter, pins 12 and 13 of IC1, is interposed in line 212 between IC3 and IC4. Line 212 also connects via line 214 to the "clear" pin, pin 14, on IC2. Thus, when count in IC2 and IC3 has advanced 36 counts, the counter 44 is reset, and the cycle repeats.

As described previously, the sequence of data bits output by the signal converters 42 (FIGS. 17 and 18) are transmitted by the bit transmission line 195. As shown in FIG. 19, the signals on the data bit transmission line 195, DATA BIT, are twice inverted, preferably by using pins 1, 2, 3 and 4 of IC1. The DATA BIT line is connected to ground across a 1K fixed resistor 215.

The entire data conversion and sending unit 36 comprises 15 integrated circuit chips when the switch type sensors are used, and an additional nine comparator chips for a total of 24 chips when the electrode type sensors are employed in the fluid level sensing unit 34. All of these chips can be placed conveniently in a length of sealed plastic pipe 217 (FIG. 1) about two feet long and about one inch in diameter. The chips can be secured along a length of board (not shown) inserted in the pipe, which is then filled with epoxy or some other suitable filler.

The 31-wire cable 169 from the fluid level sensing unit 34 is connected by a cable connector to one end of the pipe 217 carrying the data conversion and sending unit 36. Similarly, a cable connector can be used to connect the eight wires servicing the data conversion and sending unit 36 with an 8-wire cable 218 (FIG. 1) which in turn connects to the data management and pump control unit 38.

It will be appreciated that the data conversion and sending unit reduces the number of wires leaving the fluid level sensing unit from 31 (in the embodiment using 30 sensors and one ground wire) to only eight wires (one data bit return wire, three ground wires, two wires carrying voltage supply, and the CLOCK and CLOCK RET wires). This is advantageous because, as shown in FIG. 1, the data conversion and sending unit 36 can be placed far down in the well casing 16 a short distance above the fluid level sensing unit 34. This requires the use of much less wire making the system more economical and easier to maintain.

The Data Management and Pump Control Unit

The first portion of the data management and pump control unit 38 is illustrated in FIG. 20. The wires in the 8-wire cable are shown in the lower left-hand corner. As described above in connection with FIG. 19, wires 7 and 8 carry the clock and clock return and are designated CLOCK and CLOCK RET, respectively.

The pulse is generated by a pulse generator 62 (see FIG. 2), such as a 555 integrated circuit connected to run as a low frequency oscillator. The pulse preferably has a one-quarter second width and an approximately square wave form. The pulse generated by the pulse generator 62 is connected by the wire 220, through a 20K fixed resistor R1, to the positive terminal of an amplifier 224. A suitable amplifier is a TL084 integrated circuit. The negative terminal is connected to a common ground. A 50K variable resistor R2 is interposed between the input line 220 after the 20K fixed resistor R1 and the output line 228, which is continuous with wire 7, CLOCK. A 1K fixed resistor 230 is interposed between the end of wire 8, CLOCK RET, and the wire 7, CLOCK. The resistor 230 is connected to ground by the wire 232.

The amplitude of the pulse from the amplifier 224 is determined by the ratio of R1:R2. When +5 volts are input, the output will be +5 volts if R1:R2 equals 1:1. Similarly, the output will be 10 volts if R1:R2 equals 1:2. This may be necessary in systems involving very long lines, such as in deep wells.

The line 240 extends from the output line 220 of the pulse generator 62 and carries the pulse to the shift registers 64 (FIG. 2). Interposed in the line 240 is an inverter 241, such as a 7404 integrated circuit. The line 240 from the inverter 241 is connected to a pair of one-shots 242 (a 74123 circuit) and 243 (a 74125 circuit) and then through another inverter 244, such as pins 10 and 11 of the 7404 circuit.

Integrated circuits 74164 are suitable as shift registers 64, and five are required for this embodiment. The line 240 from the inverter 244 supplies the pulse to the clock pin, "CLK", pin 8, of each of the shift register circuits 64. The gain of the TL084 amplifier 224 is adjusted for about +4 to +5 volts to the inverter 241.

The pulse from the pulse generator 62 advances the data bits which are transmitted up from the data conversion and sending unit 36 on wire 5 "DATA BIT". The DATA BIT wire 5 is connected to the input pins 1 and 2 of the first of the shift register circuits 247. An inverter 250, such as a 7404 integrated circuit, is interposed in the DATA BIT line and the first shift register circuit.

Now it will be understood that the shift register circuits are connected in series, the output of pin 13 in each circuit being connected to the input pins, pins 1 and 2, of the succeeding circuit. Thus, the data bits are shifted in a continuous stream through the shift register circuits.

After 36 pulses (assuming 30 sensors and six control bits), the shift register circuits will contain a complete series of bits. The top three bits ("101" from CB1, CB2 and CB3) and the bottom three bits ("101" from CB4, CB5 and CB6) are input to a decoder 66 (FIG. 2), such as an integrated circuit 7430. This triggers a one-shot 256, such as an integrated circuit 74123, which loads the content of the shift register circuits into data registers 68 to be described.

The signal from pin 12 of the one-shot 256 is inverted, preferably by connecting the wire 257 through pins 10 and 11 of the inverter circuit 7404. The inverted signal next is transmitted by the wire 258 to load the data register circuits 68.

A second one-shot 260 is connected by the line 262 to the "clear" pins, pin 9, of the shift register circuits. The signal from the second one-shot 260 is inverted by the 7404 inverter circuit (pins 12 and 13). Thus, after the data register circuits 68 are loaded, the shift register circuits 66 are reset and ready to receive the next series of data bits.

Figure 21:
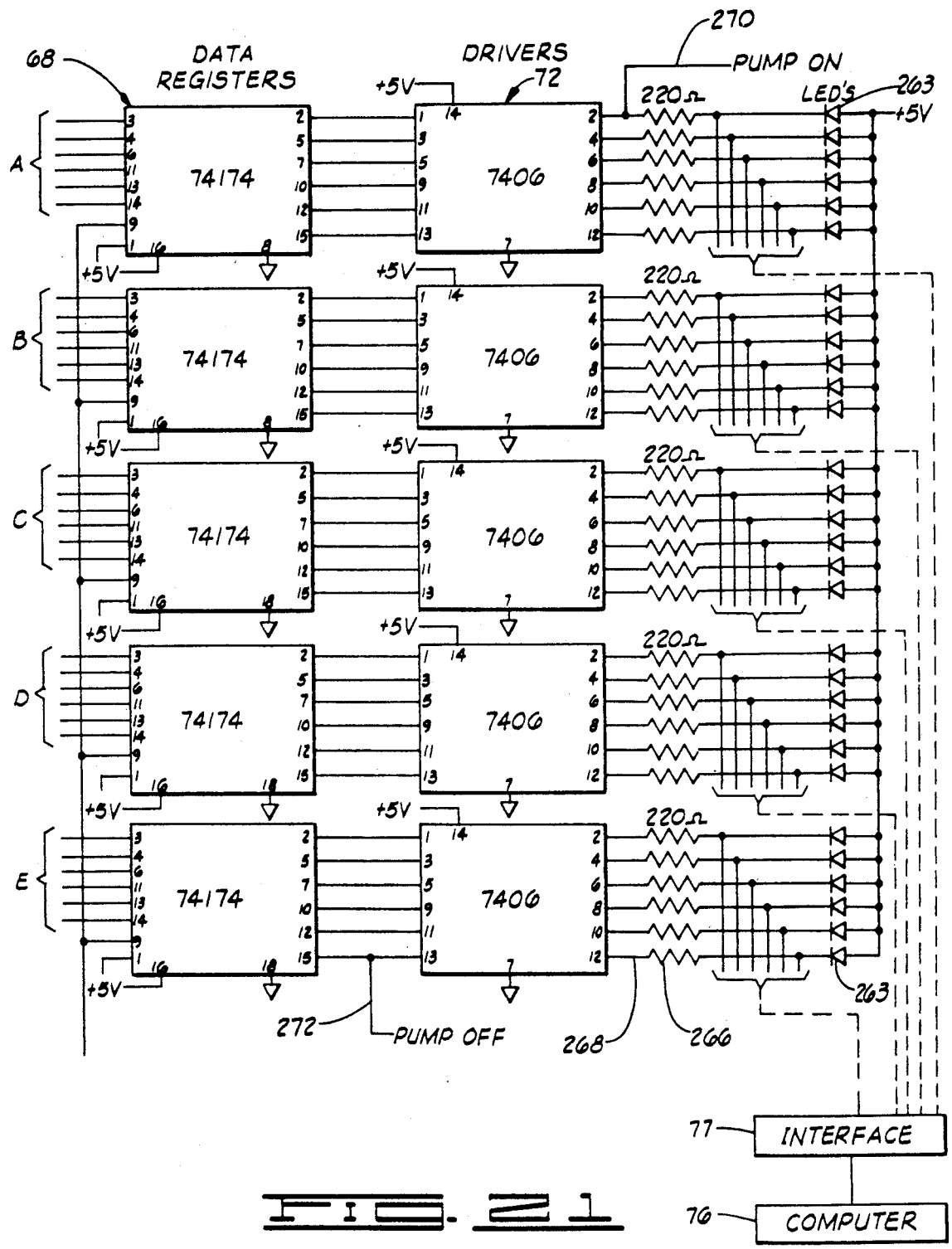
FIG. 21 is a schematic representation of another portion of the data management and pump control unit. In this embodiment, which operates with either of the sensor embodiments shown in FIGS. 10 and 14, the data bits are fed through data registers and then drivers to a single set of light emitting diodes.

In the embodiments comprising the mechanical switch (FIG. 10) or the electrodes (FIG. 14), the data bits transmitted on the line 258 (FIG. 20) are input to data registers 68, as shown in FIG. 21. The data registers 68 may be comprised of a plurality of 74174 integrated circuits. Five 74174 circuits are required for this embodiment.

The contents of the data registers 68, in this embodiment 30 data bits representing the 30 sensors, is used to control devices from which the status—submerged or not submerged—of the sensors, and thus the level of fluid, can be humanly perceived. Light emitting diodes ("LED") are ideal for this purpose. In a suitable panel, LED's produce a visual signal which can be readily perceived and monitored by the operator of the system. A constant visual readout shows the fluctuations in the fluid level.

As shown in FIG. 21, the contents of the data register circuits 68 can be used to control LED's, designated collectively herein by the reference numeral 263, in an LED panel 70 (FIG. 2) through drivers 72 (FIG. 2), such as integrated circuits 7406. Five are required for this embodiment. 220 Ohm fixed resistors 266 are interposed in the output lines 268 from the driver circuits to the LED's 263.

As indicated previously, it is desirable to provide for pump control in response to the fluid level indicated by the data from the data conversion and sending unit 36. For this purpose, "pump on" and "pump off" points may be selected.

For example, if the sensors are spaced at one foot intervals over 30 feet, it may be desired to turn the pump on when the fluid level reaches the top sensor and to turn the pump off when the fluid has returned to the level of the lowest sensor. In this instance, the "pump on" point would correspond to SW30 (or EL30) (see FIGS. 17 and 18). Likewise, the "pump off" point would correspond to SW1 (or EL30). It will be understood that the "pump on" point or the "pump off" point or both may be adjusted as necessary without disturbing the submerged portions of the system, the fluid level sensing unit 34 and the data conversion and sending unit 36.

As shown in FIG. 2, the "pump on" and "pump off" points can be connected in series with a flip-flop circuit 74 which controls the operation of the pump operating assembly 24. A suitable flip-flop circuit is integrated circuit 7474. This circuit is tripped on or off by a "0" signal.

The driver circuits 72 invert the signals received from the shift register circuits 64. Due to the inverters in the system, an output of "1" from the data register circuits 68 indicates that the corresponding sensor is submerged. This signal is inverted to "0" by the driver circuits 72. Thus, the "pump on" connecting point 270 is on the output side of the driver circuits 72. An output of "0" from the data register circuits 68 indicates that the corresponding sensor is not submerged. Thus, the "pump off" connecting point 272 is on the input side of the driver circuits 72.

In operation, when the pump is off and the fluid rises to the top sensor, the pump flip-flop 74 is tripped by the "0" output by the driver circuit 72 turning on the pump 22 (FIG. 1 and 2). As the pump operates, the fluid level drops until the lowest sensor is no longer submerged. At this point, the flip-flop 74 is tripped again by the "0" output by the data register circuits 68 turning off the pump 22.

The "pump on" 270 and "pump off" 272 points may be operated manually by using a "jumper" wire or a patch. Automatic operation is possible using rotary switches, one for the "on" depth and one for the "off" depth.

Referring again to FIG. 2, it will be appreciated that while the data management and pump control unit 38 operates without the aid of a computer, a computer 76 can be advantageously included. A computer permits recording of the raw data received from the data conversion and sending unit 36 and also ca be utilized to compute other data useful in managing the fluid recovery process.

Useful information which ca be provided by the computer 76 includes (1) the volume of fluid removed, or output, in each pumping cycle; (2) the number of pumping cycles per day; (3) the total pumping time and filling time (pump off) per day; and (4) the actual efficiency of the pump, based on the theoretical rate output in relation to the actual rate output.

Useful computer-generated graphs include the actual pump efficiency taken at hourly intervals plotted against the maximum pump efficiency. It is useful to plot the fluid level taken at hourly intervals over a 24 hour period. The computer can be programmed to record this information on a floppy disk periodically, such as hourly. A "low disk" warning should be included in any such program to prevent loss of information.

As shown in FIG. 21 and also in FIG. 2, the computer 76 preferably is interfaced with the data management and pump control unit 38 by means of an interface assembly 77 which is known in the art.

Figure 23:
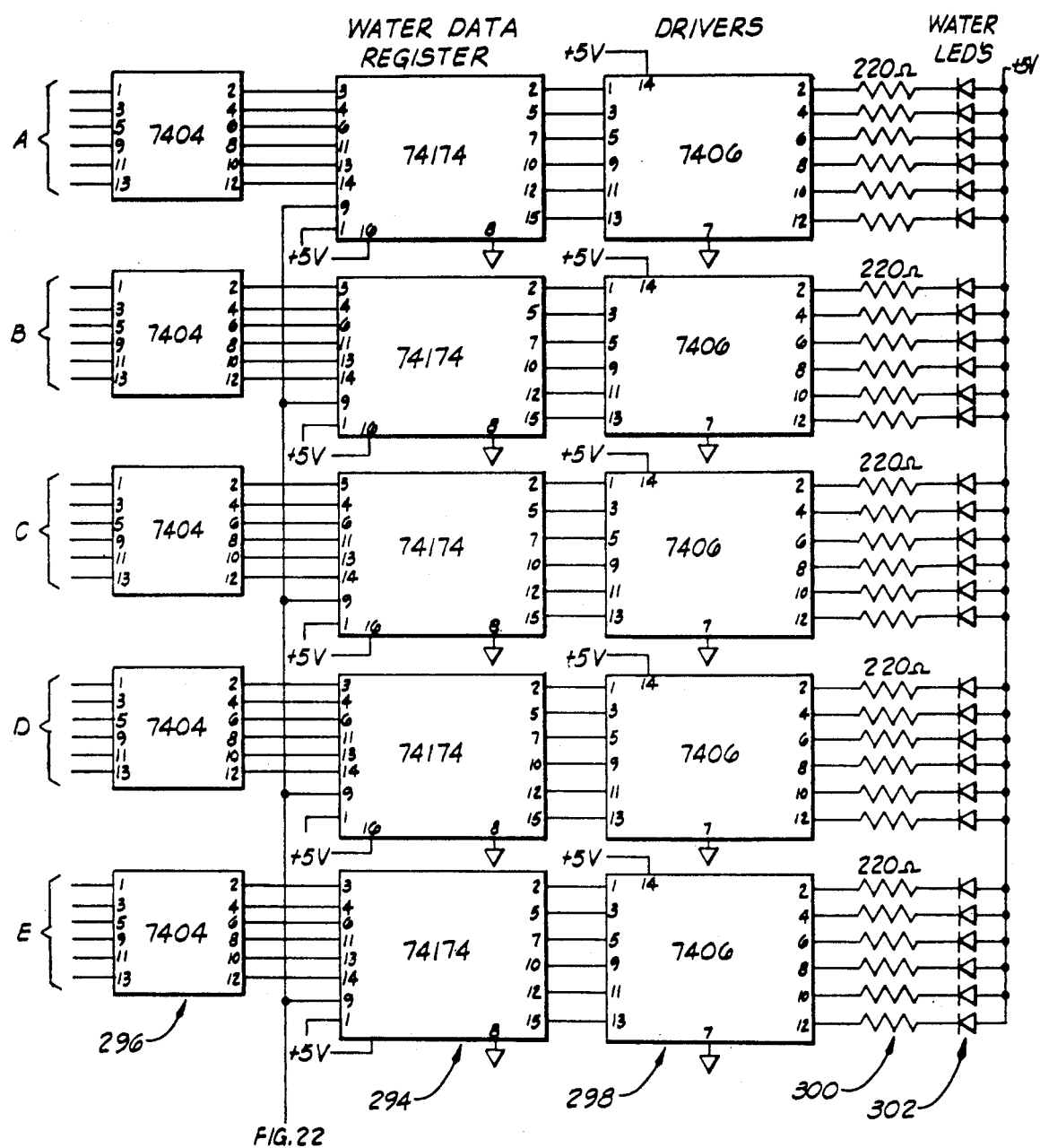

When the sensors 40B of the embodiment shown in FIG. 16 are employed, the circuitry shown in FIGS. 22 and 23 should be utilized instead of that shown in FIG. 20. Beginning with FIG. 22, it will be recalled that the operation of the phototransistors of this embodiment are controlled by an oil/water switch, designated in FIG. 22 by the reference numeral 280.

As previously indicated, this switch 280 operates between an "oil" position and a "water" position. When the switch 280 is in the "oil" position, the nor gate 282 causes the load pulse on line 258 (FIG. 20) to advance the data from the shift registers 64 on lines A-E to be input into the oil data registers 284, which preferably also are 74174 circuits. From the data registers 284, the data is transmitted to a first set of light emitting diodes 286 across 220 Ohm resistors 288 by driver circuits 290.

When the switch 280 is in the "water" position, the load pulse 258 is transmitted by the nor gate 292 to water data registers 294, as shown in FIG. 23. Inverters 296, such as 7404 circuits are interposed in the lines A-E from the shift registers 64. The data from the water data registers 294 is transmitted by drivers 29 across 220 Ohm resistors 300 to a second set of light emitting diodes 302.

With the switch 280 in the "oil" position, the phototransistor 188 is operable due to the ground connection. Accordingly, the presence of oil may be determined by inspecting the oil light emitting diodes. When the switch 280 is turned to "water", the phototransistor 188 is disconnected from the ground. In this mode, the presence or absence of water between the electrodes 183 and 184 may be determined.

The switch 280 may be manually or automatically operated. It may be controlled by the computer. In this regard it should be noted that, while the computer 76 and interface assembly 77 (FIG. 21) are not depicted in FIGS. 22 and 23, these features can be included in the same manner as previously described.

Further, it will be understood that in most instances the first and second sets of light emitting diodes will be contained in a single panel. Still further, instead of two sets of light emitting diodes, dual colored diodes may be used. In this case, one color would indicate oil and one color would indicate water.

Those familiar with the operation of petroleum recovery methods and machinery will appreciate immediately the advantages of a system by which the presence in the well at the pump level of oil or water can be determined. For example, a three-way oil/water flow valve can be installed in the output line of the well. The valve can be operated manually or, more preferably, automatically by the data management and pump control unit. When the sensors indicate that the pump is pumping water, the valve is turned to connect the outflow line with the water reservoir. When the sensors indicate that the pump is pumping oil, the valve is turned to connect the outflow line to the oil recovery system. This feature will improve the efficiency of almost any oil recovery system.

Changes may be made in the combination and arrangement of the various parts, elements, steps and procedures described herein without departing from the spirit and scope of the invention as defined in the following claims.

What is claimed is:
1. A system for monitoring and controlling the level of fluid in a vessel, comprising:
a plurality of sensors supported at selected levels in the vessel, wherein each such sensor is capable of inputting an electrical signal and, in response thereto, outputting a first electrical signal if the sensor is submerged in fluid and a second electrical signal if the sensor is not submerged, and wherein the input and output of each sensor is independent of each other sensor;

means for transmitting an electrical signal to each of the sensors;

means for converting the electrical signals output by the sensors into digital signals;

means for receiving the digital signals from the electrical signal converter means and converting the digital signals to a humanly perceivable form; and means responsive to the digital signals for adjusting the fluid level in the vessel to a preselected fluid level.

2. The system of claim 1 wherein the means for converting the electrical signals output by the sensors into digital signals comprises:

a tri-state converter gate for each sensor for receiving the signal output by that sensor, each such gate capable of outputting a first digital signal if a first electrical signal is received from the sensor and a second digital signal if a second electrical signal is received from the sensor, the output of the gate being activated by an electrical pulse;

and wherein the system further comprises:

means for generating electrical pulses;

means for counting the pulses in repeating sequences, each such sequence comprising a pulse corresponding to each of the sensors; and means for decoding the counted pulses and directing each such pulse in response thereto to the corresponding tri-state gate.

3. The system of claim 2 wherein the means for receiving and converting the digital signals into a humanly perceivable form comprises:

register means for receiving the sequence of digital signals from the means for converting the electrical signals into digital signals;

means for presenting the digital signals in a humanly perceivable form; and driver means for transmitting the sequences of digital signals from the register means to means for presenting the digital signals in a human perceivable form.

4. The system of claim 3 further comprising:

means for including in the sequence of digital signals output by the electrical signal converter means a subsequence of digital signals which designate the end of each sensor sequence and a subsequence of digital signals which designate the beginning of each sensor sequence;

and wherein the register means comprises:

shift register means for receiving the sequence of digital signals output by the electrical signal converter means;

decoder means for selecting out the subsequences designating the beginning and end of the sensor sequence;

data register means for receiving the sensor sequence from the shift register means;

means responsive to the decoder means for one-shot loading of the sensor sequence from the shift register means into the data register means; and means responsive to the decoder means for resetting the shift register means.

5. The system of claim 4 wherein the means for presenting the digital signal in a human perceivable form comprises light emitting diodes.

6. The system of claim 1 wherein each sensor is a switch comprising:

a housing comprising a hollow perforate body; a first conductive contact element in the housing, and a second buoyant conductive contact element in the housing below the first contact element and supported for movement relative to the level of fluid in the housing between a first position in which there is no contact with the first contact element and a second position in which there is contact with the first contact element.

7. The system of claim 1 in which each of the sensors comprises a pair of electrodes supported a distance apart for sensing the resistance therebetween so that the first electrical signal indicates low resistance and the second electrical signal indicates high resistance, and in which the means for converting the electrical signals output by the sensors into digital signals includes:

means for receiving the first and second electrical signals and outputting a first selected voltage in response to input of a first electrical signal from the sensor and a second selected voltage in response to input of a second electrical signal from the sensor;

a tri-state converter gate for each sensor for receiving the first and second selected voltage, each such gate capable of outputting a first digital signal if a first selected voltage is received from the sensor and a second digital signal if a second selected voltage is received from the sensor, the output of the gate being activated by an electrical pulse;

means for generating electrical pulses;

means for counting the pulses in repeating sequences, each such sequence comprising a pulse corresponding to each of the sensors; and means for decoding the counted pulses and directing each such pulse in response thereto to the corresponding tri-state gate.

8. The system of claim 7 in which each of the sensors further comprises an infrared light emitting diode and a phototransistor disposed a distance from the diode, the phototransistor being capable of receiving light emissions from the diode and in response thereto emitting a first electrical signal if the light transmission is high and a second electrical signal is the light transmission is low; and wherein the system further comprises means for activating and deactivating the phototransistor whereby the sensor selectively outputs either the first and second signals from the phototransistor or the first and second signals from the pair of electrodes.

9. The system of claim 1 further comprising a data management means for receiving and storing signals from the electrical signal converter means, and for later retrieving the stored signals in accordance with predetermined programming.

10. The system of claim 1 wherein the fluid level adjustment means comprises:

a pump for removing fluid from the vessel;

a pump operating assembly for operating the pump; and a pump flip-flop circuit responsive to digital signals from selected sensors for turning on and turning off the pump operating assembly.

11. The system of claim 1 wherein each sensor comprises means for measuring electrical resistance in the vessel and wherein the first signal is indicative of low resistance and the second signal is indicative of high resistance.

12. The system of claim 11 wherein the means for transmitting an electrical signal to each of the sensors comprises means for transmitting the electrical signals to the sensors sequentially in a selected order, and wherein the means for receiving the digital signals from the electrical signal converter means comprises means for receiving the digital signals sequentially in a selected order corresponding to the order in which the electrical signals are input into the sensors.

13. The system of claim 12 wherein the digital signals are converted to a visually perceivable form.

14. The system of claim 1 wherein the means for transmitting an electrical signal to each of the sensors comprises means for transmitting the electrical signals to the sensors sequentially in a selected order, and wherein the means for receiving the digital signals from the electrical signal converter means comprises means for receiving the digital signals sequentially in a selected order corresponding to the order in which the electrical signals are input into the sensors.

15. The system of claim 14 wherein the digital signals are converted to a visually perceivable form.

16. A system for monitoring and controlling the level of fluid in a vessel, comprising:

a plurality of sensors supported at selected levels in the vessel;

means in each sensor for measuring electrical resistance in the vessel, such means capable of receiving an electrical signal and, in response thereto, outputting a first electrical signal if the sensor is submerged in fluid, a second electrical signal if the sensor is not submerged;

means in each sensor for measuring light transmission in the vessel at the level of the sensor, such means capable of receiving an electrical signal and, in response thereto, outputting a first electrical signal if the light transmission is high and a second electrical signal if the light transmission is low;

means for transmitting an electrical signal to each of the sensors;

means for controlling the operation of the light transmission measuring means and the electrical resistance measuring means so that the sensor outputs the electrical signals from a selected one of the light transmission measuring means and the electrical resistance measuring means;

means converting the electrical signals output by the sensors into digital signals;

means for converting digital signals from the electrical signal converter means into a humanly perceivable; and means responsive to the signals for adjusting the fluid level in the vessel to a preselected fluid level.

17. The system of claim 16 wherein the light transmission measuring means comprises:

means for emitting light; and means for receiving light from the light emitting means.

18. The system of claim 17 wherein the light emitting means is an infrared light emitting diode and the light receiving means is a phototransistor.

19. The system of claim 16 wherein the means for measuring electrical resistance in the vessel comprises a pair of electrodes supported a distance apart for sensing the resistance therebetween.

20. The system of claim 19 wherein the light transmission measuring means comprises:

means for emitting light; and means for receiving light from the light emitting means.

21. The system of claim 20 wherein the light emitting means is an infrared light emitting diode and the light receiving means is a phototransistor.

22. A system for monitoring and controlling the level of fluid in a vessel, comprising:

a plurality of sensors supported at selected levels in the vessel;

means in each sensor for measuring electrical resistance in the vessel, such means capable of receiving an electrical signal and, in response thereto, outputting a first electrical signal if the sensor is submerged in fluid, and a second electrical signal if the sensor is not submerged;

means for transmitting an electrical signal independently to each of the sensors;

means for converting the electrical signals output by the sensors into digital signals;

means for converting digital signals from the electrical signal converter means into a humanly perceivable; and means responsive to the signals for adjusting the fluid level in the vessel to a preselected fluid level.

23. The system of claim 22 wherein the means for measuring electrical resistance in the vessel comprises a pair of electrodes supported a distance apart for sensing the resistance therebetween.

* * * * *

UNITED STATES PATENT AND TRADEMARK OFFICE
CERTIFICATE OF CORRECTION

PATENT NO. : 5,035,581

DATED : July 30, 1991

INVENTOR(S) : Danny McGuire et al

It is certified that error appears in the above-identified patent and that said Letters Patent is hereby corrected as shown below:

Title Page:
In the abstract, line 19, please delete "responsae" and substitute therefor --response--.

Col. 3, line 51, please delete "10", and move the following phrase to begin an new paragraph.

Col. 6, line 43, please delete "connecter" and substitute therefor --connector--.

Col. 6, line 51, please delete "connector" and substitute therefor --connected--.

Col. 6, line 52, please delete "connecting" and substitute therefor --connector--.

Col. 12, line 53, preceding "220" please insert --Referring still to Fig. 21--.

Col. 13, line 42, please delete "ca" and substitute therefor --can--.

Col. 16, line 1, please move "a first" to begin a new line indented equal to line 1 of this column.

Col. 16, line 42, please delete "is" and substitute therefor --if--.

UNITED STATES PATENT AND TRADEMARK OFFICE
CERTIFICATE OF CORRECTION

PATENT NO. : 5,035,581

DATED : July 30, 1991

INVENTOR(S) : Danny McGuire et al

It is certified that error appears in the above-identified patent and that said Letters Patent is hereby corrected as shown below:

Col. 18, line 3, preceding the ";" please insert --form--.

Signed and Sealed this

Twenty-fifth Day of May, 1993

Attest:

MICHAEL K. KIRK

Attesting Officer

Acting Commissioner of Patents and Trademarks